Patented Nov. 8, 1927.

1,648,858

UNITED STATES PATENT OFFICE.

MEILACH MELAMID, OF FREIBURG, GERMANY.

CONDENSATION PRODUCT AND METHOD OF MAKING SAME.

No Drawing. Application filed May 6, 1920, Serial No. 379,426, and in Germany December 27, 1918.

My invention relates to products of condensation of phenols and aldehydes and more especially formaldehyde. Its particular objects are novel products of this class and the methods of making same.

As is well known, if phenols are reacted upon with aldehydes and more especially with formaldehyde in alkaline, acid or neutral solution, products of a resin-like character are obtained. The products obtained after the older methods are in general evil smelling substances liable to get brittle and to change their color under the action of air and light; the varnishes and the coatings produced therewith undergo similar changes. More recent methods tending to obviate these drawbacks require either a raw material of special purity differing from the commercial mixtures of phenols, or greater quantities of acid condensing agents which can be regenerated only by very complicated methods. All these processes result in products which are either soluble in alkali or can be dissolved only with great difficulty in the usual varnish solvents.

I have now ascertained that by treating the mixture of a phenol and an aldehyde and more especially formaldehyde, or else the products of condensation resulting from such mixture, with sulfochlorides of the aromatic type and more especially the sulfochlorides of such aromatic compounds as still contain carboxyl or hydroxyl groups or both, products of a novel kind are formed. I have further ascertained that instead of aromatic sulfochlorides, phosgene or the anhydrides of organic acids, such as for instance acetic anhydride, may be employed. By heating such products in vacuo to a temperature exceeding 100 degrees C. their resinous character is greatly improved so that they resemble to all purposes natural resins and have a higher melting point than before.

If, as stated above, the mixture of a phenol and an aldehyde or the product of condensation resulting therefrom are treated with an aromatic sulfochloride, preferably in an alkaline solution, products of a resin-like character are obtained which are very hard and brittle, easily soluble in benzol and acetone, absolutely neutral, melt at a high temperature and are transparent and of a light color which does not undergo any change under the action of air and light. I prefer carrying the condensation not further than the formation of phenol alcohols as I do not intend forming resins during the first reaction but merely soluble phenol alcohols.

By using sulfochlorides of aromatic compounds which still contain carboxyl or hydroxyl groups or both, the capability of forming high molecular compounds is greatly increased, the products thus obtained being absolutely like natural resins. In carrying this method into effect I cause alcoholates to react upon the sulfochlorides containing carboxyl or hydroxyl groups in the presence of alkali, care being taken that at least one of the carboxyl or hydroxyl groups be present in the form of the alkali metal salt, when the reaction is carried through; I even prefer employing some alkali in excess. The whole quantity of the alkali may be added from the beginning, or else one of the two substances containing hydroxyl or carboxyl groups or both may be dissolved in an alkali before being mixed with the other substance, corresponding quantities of caustic alkali being gradually added to the mixture, I may use any mixture of sulfochlorides containing the hydroxyl or the carboxyl group. I may for instance use two or more sulfochlorides containing either one or the other group or different sulfochlorides containing one and the same group and I may also use mixtures of such sulfochlorides with other sulfochlorides. The products obtained according to this process may be saponified and after saponification form soaplike substances adapted to foam and to form emulsions, such products lending themselves to the manufacturer of solid lubricants from tar oils and the like and being similar or equal to natural resins or fats.

In the case where an anhydride of an organic acid, such as acetic anhydride is used white products resembling celluloid are obtained.

The products described above may be transformed into hard transparent substances having a higher melting point, by heating them in vacuo preferably to temperatures exceeding 100 degr. C. To this end the products may either be heated directly or else they may be dissolved in a solvent and the solvent may then be distilled off, the residue being heated in vacuo.

*Example 1.*—100 grams of cresol alcohol obtained in some well known manner from commercial phenol (cresylic acid) are dissolved in dilute soda solution, the latter being a little in excess. A solution of 137 grams toluol sulfochloride in 500 grams benzol is then added and the mixture is stirred several hours, the temperature not exceeding 30 degr. C. The benzol layer containing the product of the reaction is washed in order to remove the alkali which may be left and is then dried, whereupon the benzol is distilled off. The solid product thus obtained is hard and of a light yellow color and in all respects resembles a natural resin such as copal.

The reaction may perhaps be explained by the following formula:

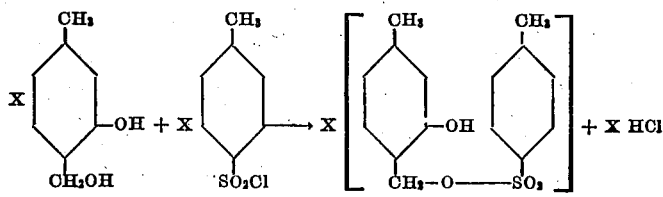

*Example 2.*—In replacing the sulfochloride by phosgene, the gaseous character and other properties of the phosgene are taken into account, phosgene being for instance introduced, while stirring, into an equal quantity of a phenol alcohol solution covered with a layer of benzol. After the reaction has come to an end, the benzol layer containing the product of reaction is treated as before.

Without attempting to specify the composition of the resinous body and its chemical constitution with certainty, the constitution being in fact immaterial for the purposes of my invention, the reaction may be illustrated by the following formula:—

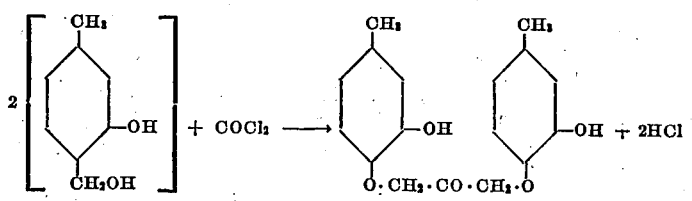

a keton-like body being formed.

*Example 3.*—100 grams cresol alcohol are dissolved in dilute soda solution, this latter being a little in excess. The solution is then mixed with a solution of 74 grams anhydride in 400 grams benzol or some other suitable solvent, the mixture being well stirred. The solution containing the product is washed and dried and the solvent is distilled off.

In this case the reaction may perhaps be explained by the following formula without, however, making any claim thereby that it correctly represents the constitution of the resinous reaction product:—

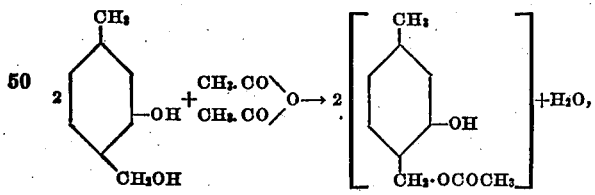

an ester-like body being thereby obtained. However, as already stated, the representations of the constitution of the reaction products as expressed by the above formulæ are more or less hypothetical, though a high degree of probability is attached thereto.

The products obtained and described may then be heated in vacuo to temperatures preferably exceeding 100 degr. C. in order to improve their resinous character.

I claim:—

1. The method which consists in reacting upon a phenolic body and an aldehyde with an aromatic sulfo-chloride and heating the product obtained substantially in vacuo.

2. The method which consists in reacting upon a phenolic body with an aldehyde, treating the product obtained with an aromatic sulfo-chloride, and then heating the resulting condensation product substantially in vacuo.

3. The method which consists in reacting upon a phenol-alcohol with an aromatic sulfo-chloride, and heating the product obtained substantially in vacuo.

In testimony whereof I affix my signature.

Dr. MEILACH MELAMID.